Figure 1:
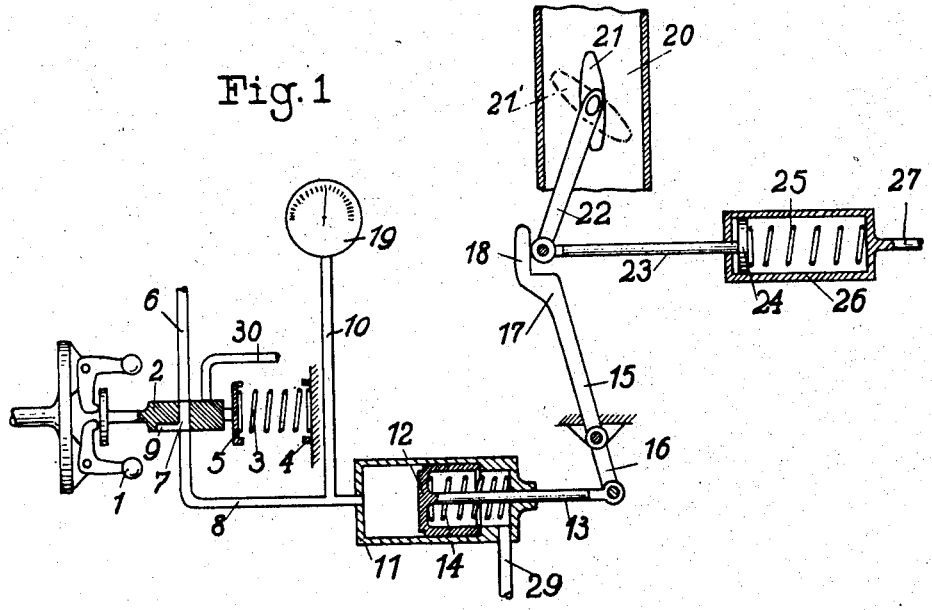

Oct. 28, 1941.  K. MAYBACH  2,260,576
DEVICE FOR SAFEGUARDING INTERNAL COMBUSTION ENGINES AGAINST
EXCESSIVE SPEED AND LUBRICATION FAILURE
Filed April 7, 1939  2 Sheets-Sheet 1

Inventor:
Karl Maybach
By
Watson, Cole, Grindle & Watson
Attys.

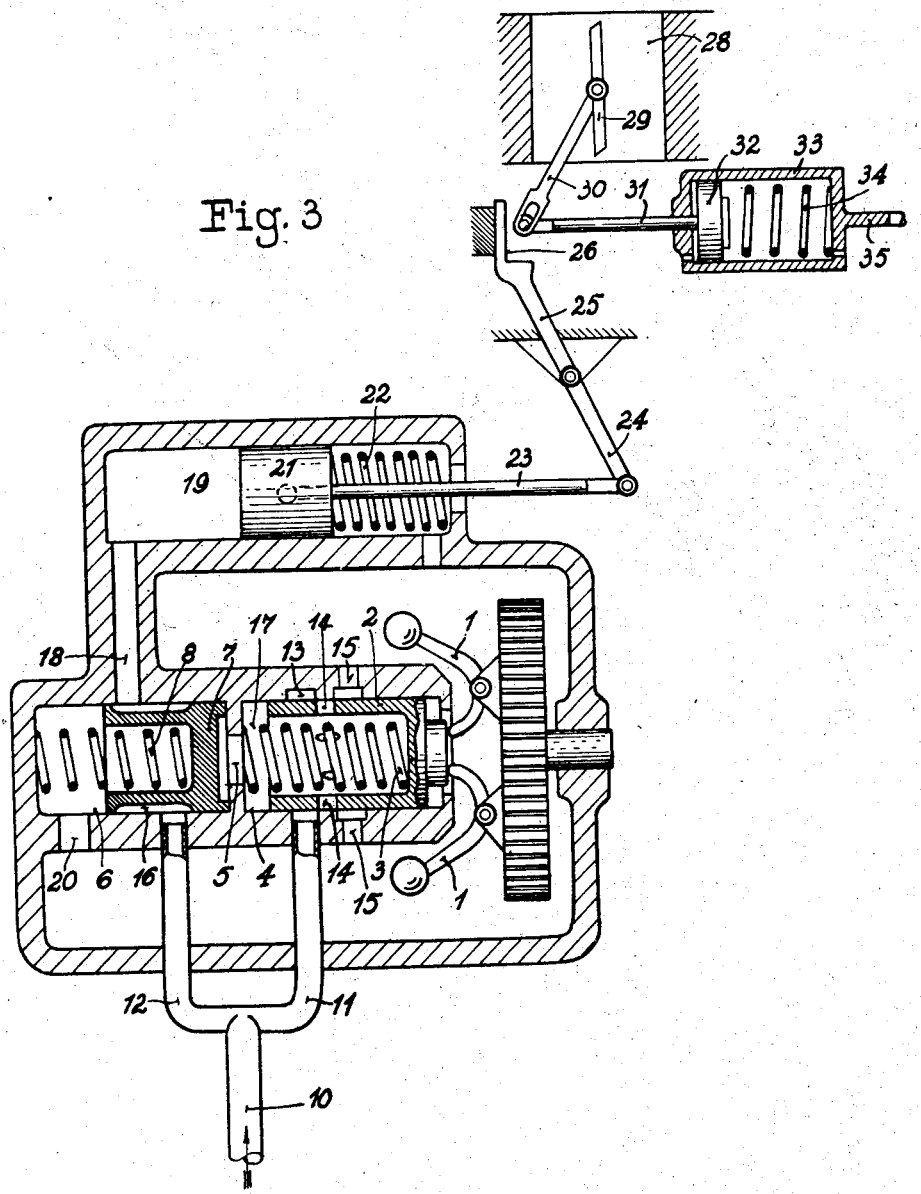

Patented Oct. 28, 1941

2,260,576

UNITED STATES PATENT OFFICE 2,260,576

DEVICE FOR SAFEGUARDING INTERNAL COMBUSTION ENGINES AGAINST EXCESSIVE SPEED AND LUBRICATION FAILURE

Karl Maybach, Friedrichshafen-on-the-Bodensee, Germany, assignor to Maybach-Motorenbau Gesellschaft mit beschrankter Haftung, Friedrichshafen-on-the-Bodensee, Germany Application April 7, 1939, Serial No. 266,628
In Germany April 14, 1938

5 Claims. (Cl. 123—102)

The invention relates to a safety arrangement for internal combustion engines, in particular of automobile vehicles, in which the regulating member for the output of the engine can be influenced on the one hand by the driver of the vehicle and on the other hand by an actuating arrangement operated by oil pressure.

According to the invention, the actuating arrangement is so constructed that it adjusts the engine to a low output as soon as the oil pressure has fallen to a value which is too low for the operation. The oil pressure is transmitted to the actuating arrangement by a control member moved by a centrifugal governor. Above a certain speed, the pressure of the oil is relieved in the actuating arrangement and adjustment to a lower speed is thereby also effected.

The arrangement is preferably constructed in such a manner that a transmitting device dependent upon the speed of the engine influences an electrical control by which the control member is actuated. This arrangement preferably adjusts the speed to a low value which is preferably equal to that also automatically adjusted in the event of shortage of oil, for example a speed of 1000 or 1500 revolutions per minute with a maximum normal speed of about 3000 revolutions per minute.

The arrangement may be such that an indicating arrangement is provided for the range between the normal maximum speed and the maximum speed which also must not be exceeded even in exceptional cases. The known similar safety arrangements either only prevent a certain speed from being exceeded or produce warning signals or even stop the motor in the event of shortage of lubricating oil. The known arrangements are open to the disadvantage that the warning signals are either not observed at all or are only observed too late by the driver of the vehicle. Moreover, the stopping of the driving engine cannot in all circumstances be permitted; for example, if a vehicle were travelling within a somewhat long column of vehicles, the sudden stoppage of the drive of the vehicle might cause a collision. These disadvantages are overcome by the arrangement according to the invention. In driving engines of automobile vehicles which are provided with the safety arrangement according to the invention, absolute security is afforded on the one hand against any damage owing to shortage of oil and on the other hand against damage due to inadmissibly high speeds. At the same time, it is also possible when such a vehicle is travelling within a series of other vehicles to avoid collision and to drive the vehicle concerned to the side with reduced engine output.

The arrangement according to the invention is particularly suitable for vehicles with which it is not possible for the driver to determine from the sound of the engine the gear in which the vehicle is travelling. It can therefore advantageously also be such that the exceeding of the maximum speed permissible during operation, for example 3000 revolutions per minute, is indicated by special markings on the speedometer or by an optical or acoustic signal, but that in exceptional cases, for example during gear changing, a speed range lying above this speed permissible during normal operation, for example one extending up to a speed of 3500 revolutions per minute, may be employed by the driver while at the same time a warning is given by the aforesaid signal, whereafter the arrangement according to the invention responds at 3500 revolutions per minute and prevents this speed from being further exceeded by throttling the engine. In the case of other vehicles in which it is impossible or difficult to verify the speed by means of optical signals or by reading the oil pressure from pressure meters, a flicker lamp is advantageously provided which is automatically switched on when the maximum speed permissible during normal operation is exceeded. The continuous fluctuations of the lamp light have a certain disturbing effect on the eyes of the driver of the vehicle, so that his attention is rapidly drawn to the fact that he is driving at a speed which is greater than the maximum speed permissible during normal operation.

Furthermore, the control member may according to the invention be constructed as a pressure regulating valve of known type, so that this valve imparts to the pressure medium a pressure which corresponds to the momentary speed. This pressure actuates a locking member which produces the reduction in the pressure of the oil in the actuating arrangement for the member regulating the output of the engine. The control member at the same time also preferably controls the pressure oil, which is made to act on the locking member. This arrangement is distinguished particularly by the fact that the pressure medium is only made to act indirectly on the control member. The advantage is thus secured that only a simple small regulator having small deflections is required, since the regulating arrangement is very sensitive and responds rapidly to speed fluctuations.

The connection of the arrangement according to the invention is such a device for indicating the exceeding of the maximum speed permissible during normal operation and for the range between this speed and the maximum speed permissible in extreme cases affords particular advantages in the case of vehicles of the aforesaid nature. Such an arrangement permits the exceeding of the maximum speed travelled at during normal operation within certain limits for starting, gear changing and the like. At the same time, exceeding of the maximum speed permissible in extreme cases is prevented, even if it is not possible to judge the circumstances by listening to the sound of the engine. Furthermore, reliable protection against damage to the bearings due to lack of lubricating oil or pipe breakage is afforded, while it is possible to place the vehicle out of operation in good time. Therefore, the generally very considerable damage directly set up, particularly in the case of vehicles in which it is not possible to judge the gear in which the engine is operating from the sound, when a disturbance is not immediately noted, is avoided.

Three constructional examples of the invention are diagrammatically shown, mostly in section, in the accompanying drawings.

Figure 2:
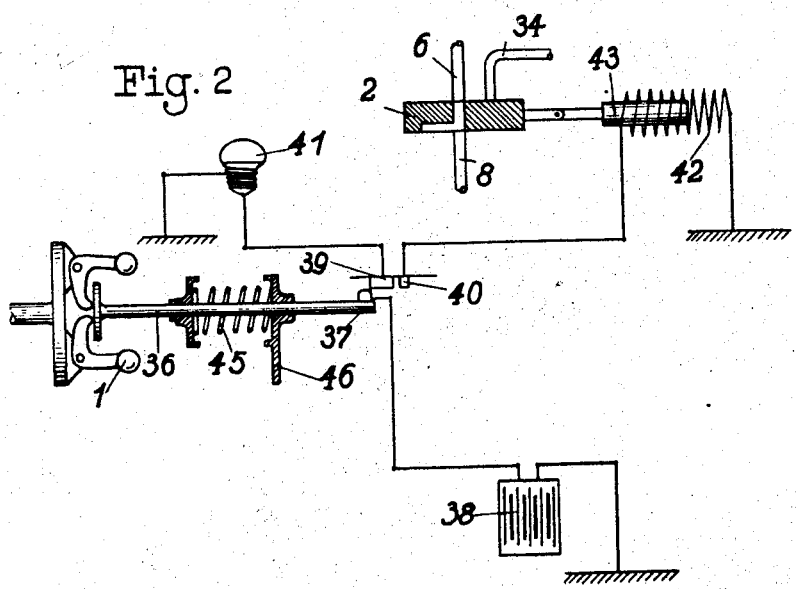

In the constructional examples shown in Figures 1 and 2, 1 is a centrifugal governor driven by the engine and actuating a slide valve 2, and 3 is a spring bearing on the one hand against a fixed abutment (cover) 4 and on the other hand against a disc 5 connected to the slide valve 2. 6 is a feed pipe connected to the lubricating oil pipe of the engine, and 7 is a control conduit in the slide valve 2, which conduit has in its lower part an extension 9 to the left-hand side. 8 and 10 are further pipes carrying the lubricating oil. 11 is a cylinder to which the pipe 8 is connected and in which there is adapted to move a piston 12 which is connected to a rod 13 and is loaded by a spring 14. 15 is a double arm lever, one arm 16 of which is connected to the rod 13, while the other arm 17 thereof has at its end a stop surface 18. 19 is an oil pressure meter.

20 is part of a carburettor, the throttle valve 21 of which is actuated by the lever 22, to which is connected the rod 23 of the usual carburettor rod system actuated by the driver of the vehicle. At the right-hand end of the rod 23 is situated a disc 24, against which bears a spring 25, which is arranged in a casing 26 connected to the further rod 27 of the rod system of the carburettor. 29 and 30 are discharge pipes communicating, for example, with the interior of the engine casing.

The arrangement shown in Figure 1 operates in the following manner:

During normal operation of the driving engine of a vehicle which is connected to the arrangement illustrated, the individual parts lie in the positions shown in the figure. As soon as the pressure of the lubricating oil has reached a value which is sufficient for supplying the lubricating points of the driving engine, this pressure is transmitted through the pipe 6, the conduit 7 and the pipe 8 into the space of the cylinder 11 and holds the piston 12 in the right-hand terminal position shown against the pressure of the spring 14. The stop surface 18 connected through the rod 13 and the lever 15 to the piston 12 is situated, as is shown in the figure, at a small distance from the rod system of the carburettor when the latter is so adjusted by the driver of the vehicle that the throttle valve 21 is fully open. The oil pressure is transmitted through the pipe 10 to the pressure meter 19, which indicates the value thereof. For the discharge of oil which, owing to leakage at the piston 12, passes to the space to the right of this piston, there is provided a pipe 29, which communicates in known manner with the interior of the engine casing.

If for any reason (pipe breakage or lack of oil) the oil pressure falls below the value necessary for the safe operation of the engine, the pressure in the space of the cylinder 11 also falls correspondingly. The spring 14 is so dimensioned that if the oil pressure falls below the lowest permissible value the piston 12 is forced to the left by the spring 14, while the rod 13 and the lever 15 displace the rod 23 to the right through the intermediary of the stop surface 18 against the pressure of the spring 25, whereby the throttle valve 21 is closed to a certain extent (position 21' shown in chain lines in the figure). The rod 27 and the remaining part of the rod system of the carburettor may remain in the position to which they are adjusted by the driver of the vehicle. When the throttle valve is in the position 21', such a quantity of gas mixture is fed to the engine that it operates at a low output, for example at about 10% of the full output. This position may in some cases also correspond to the usual idle running adjustment. The driver of the vehicle, who notices the disturbance owing to the reduction in the speed of travel, will then drive his vehicle out of the column to the side, stop and remove the defect.

If the speed of the driving engine exceeds an inadmissible value, the pressure of the spring 3 is overcome by the centrifugal force acting on the weights of the centrifugal governor 1, whereby the slide valve 2 is carried so far to the right that admission of lubricating oil from the pipe 6 to the pipe 8 through the conduit 7 is prevented. At the same time, the upper mouth of the conduit is moved into a position in front of the outlet conduit 30. The communication between the conduit 7 and the pipe 8 is maintained by the extension 9. The pressure of the oil contained in the pipe 8 and in the space of the cylinder 11 is relieved through the communication with the pipe 30, and the oil contained in the space of the cylinder 11 and in the pipe 8 flows away to the pipe 30 and consequently into the engine casing. The piston 12 moves to the left under the pressure of the spring 14. The throttle valve 21 of the carburettor is closed by the rod system 13, 15 and 18, whereby the speed of the engine is correspondingly reduced. Owing to the reduction of the speed of the engine and of the speed of travel, the driver's attention is drawn to the fact that he has endeavoured to drive at an inadmissibly high speed and that lower speed is required. Even if he takes no action to reduce the speed, after reduction of the speed of the engine the pressure of the spring 3 again overcomes the opposing force which is set up by the centrifugal force of the weights of the centrifugal governor 1, so that the slide valve 2 is again returned to the left. The slide valve 2 will now again establish communication between the pipes 6 and 8 through its conduit 7 to such an extent that the arrangement is in equilibrium, that is to say the speed is so high that the throttle valve 21 of the carburettor is held open to a sufficient extent by the oil pressure obtaining in the space of the cylinder 11 to maintain the corresponding speed of equilibrium.

Instead of the arrangement comprising the control member 2 shown, an arrangement could also be employed in which the centrifugal governor 1 acts directly upon the throttle valve 21. This arrangement has not been particularly shown, as it may readily be understood and is known.

In the construction shown in Figure 2, 36 is a pin actuated by the centrifugal governor 1 and carrying at its right-hand end an electrical contact member 37 connected to the battery 38. 45 is a control spring and 46 is a stop. 39 and 40 are two contact plates, one of which 39 is connected to a flicker lamp 41, while the other 40 is connected to a coil 42 in which an iron core 43 is displaceable and is connected to the control member 2.

When the speed permissible during normal operation is exceeded, the pin 36 is moved to the right by the centrifugal governor 1. The contact member 37 encounters the contact plate 39 and switches on the flicker lamp 41. When the speed is further increased, the contact member 37 is displaced to the right along the contact plate 39. Finally, the contact member 37 meets the contact member 40. The coil 42 is thus excited, whereby the iron core 43 is pulled to the right and the slide valve 2 is carried with it to the right. The oil is thus discharged from the space of the cylinder 11 in a manner similar to that described above and the throttle valve 21 is closed to a more or less great extent.

In the constructional example shown in Figure 3, 1 is a centrifugal regulator driven by the engine and moving the control member 2 against the action of the pressure spring 3 into the cylinder 4. The cylinder 4 communicates through the aperture 5 with a further cylinder 6 in which the locking member 7 is moved against the action of the spring 8.

10 is a feed pipe connected to the lubricating oil pipe of the engine. This feed pipe is divided into two branch pipes 11 and 12. The branch pipe 11 opens into the cylinder 4 via the annular conduit 13, while the branch pipe 12 opens into the cylinder 6. The cylindrical wall of the control member 2 is provided with apertures 14 and the locking member 7 is provided with an annular groove 16. Apertures 15 serve for the discharge of the pressure medium into the casing. The cylinders 6 and 19 communicate with one another through a conduit 18. A piston 21 is moved in the cylinder 19 against the action of the pressure spring 22. The piston 21 is pivotally connected to a rod 23, which is linked to one arm 24 of a two-armed lever, the other arm 25 of which has as its end a stop surface 26.

28 is part of a carburettor, the throttle valve 29 of which is actuated by the lever 30, to which the rod 31 of the usual rod system of the carburettor is connected. To the right-hand end of the rod 31 is connected a disc 32, against which there presses a spring 34 arranged in the casing 33. The casing 33 is connected to the rod 35 of the rod system of the carburettor, which is actuated by the driver of the vehicle.

The arrangement operates in the following manner:

Figure 3 shows the normal operating position of the individual parts. When there is sufficient pressure in the lubricating oil pipe of the driving engine, the oil is carried through the pipe 10, the branch pipe 12, the annular groove 16 and the conduit 18 into the cylinder 19, in which it holds the piston 21 in the position shown against the pressure of the spring 22, so that the rod 31 has full freedom of movement. The pressure spring 3 in the control member 2 is so dimensioned that at a predetermined speed of the driving engine and consequently of the governor 1, the slide valve 2 is moved to the left by the action of the centrifugal force of the governor 1. Oil can then flow from the pipe 11 through the apertures 14 to the space 17 and from there through the aperture 5 behind the locking member 7.

According to the action of the centrifugal pendulum 1 on the control member 2, there is set up in the space 17 an oil pressure which maintains equilibrium with the centrifugal governor in combination with the opposed action of the spring 3. As soon as the oil pressure in the space 17 is reduced below the value corresponding to the action of the centrifugal governor, the slide valve 2 is moved somewhat to the left, so that more oil can flow from the pipe 11, whereby the pressure in the space 17 is again increased, so that it overcomes the action of the centrifugal governor 1 and again moves the slide valve 2 to the right into the central position. When the pressure in the space 17 is higher than the value corresponding to the action of the centrifugal governor, the slide valve 2 is moved from the central position shown, to the right, so that some oil can flow away through the apertures 14 and the annular conduit 15. The pressure in the space 17 thus falls, so that the slide valve 2 is returned into the central position (position of equilibrium) owing to the fact that the action of the centrifugal governor is overcome. Therefore, the centrifugal governor 1 sets up in the space 17 an oil pressure depending upon the existing speed. Upon increase or decrease in the speed, the oil pressure obtaining in this space becomes greater or smaller. If at a predetermined speed the oil pressure set up in the space 17 is sufficient, it moves the locking member 7 rapidly to the left against the action of the spring 8. In this way, on the one hand the supply of oil from the pipe 12 is cut off and on the other hand communication is established between the space 19 and the discharge aperture 20 through the conduit 18 and the annular groove 16. Consequently, the oil in the space 19 is relieved of pressure so that the piston 21 is moved rapidly to the left under the action of the spring 22. The regulating member 29 of the carburettor 28 is thus closed through the rod system 23, 24, 25 and the lever 30 and the adjustment to a low speed is effected.

If there is no or insufficient oil pressure in the lubrication oil pipe in the engine while running, the piston 21 is influenced in the sense of the closing of the regulating arrangement under the action of the spring 22 to an extent corresponding to the low oil pressure.

I claim:

1. A safety device for internal combustion engines lubricated by oil supplied under pressure, comprising a fluid-pressure-operated device connected to the high pressure side of the lubricating oil system and adapted to operate upon a member for regulating the output of the engine to cause the latter to run at a low speed when the oil pressure falls to a predetermined low value, a valve connected to said fluid-pressure-operated device so as to be capable of operation to reduce the pressure of the oil therein, and a speed responsive device driven from the engine and connected to said valve so as to operate the same when a predetermined speed is exceeded.

2. A safety device as claimed in claim 1, in which said speed-responsive device is operatively connected to said valve by an electrical transmission system.

3. A safety device for internal combustion engines lubricated by oil supplied under pressure, comprising a fluid-pressure-operated device connected to the high pressure side of the lubricating oil system and adapted to operate upon a member for regulating the output of the engine to adjust the output to a low value when the oil pressure falls to an inadmissible value, a valve connected to said fluid-pressure-operated device so as to be capable of operation to reduce the pressure of the oil therein, a warning device and a speed-responsive device driven from the engine and operatively connected to said valve and said warning device so as to operate the latter when the normal maximum speed is exceeded and to operate the former when the maximum speed permissible even in exceptional cases is exceeded.

4. A safety device as claimed in claim 3 in which said warning device is an electric flicker lamp.

5. A safety device for internal combustion engines lubricated by oil supplied under pressure, comprising a fluid-pressure-operated device connected to the high pressure side of the lubricating oil system and adapted to operate upon a member for regulating the output of the engine to adjust the output to a low value when the oil pressure falls to an inadmissible value, a fluid-pressure-operated valve connected to said fluid-pressure-operated device so as to be capable of reducing the pressure of the oil therein when operated, said valve receiving oil as operating fluid through a conduit connected to the high pressure side of the lubricating oil system and through a pressure-reducing valve, and a speed-responsive device driven from the engine and acting upon said pressure-reducing valve so that the reduced pressure varies with the engine speed and at a predetermined speed attains a pressure capable of operating said fluid-pressure-operated valve.

KARL MAYBACH.